United States Patent Office 3,840,566
Patented Oct. 8, 1974

3,840,566
OXIDATION OF PRIMARY ALCOHOLS
Jean Marc Lalancette, Sherbrooke, Quebec, Canada, assignor to Ventron Corporation, Beverly, Mass.
No Drawing. Filed June 15, 1972, Ser. No. 263,188
Int. Cl. C07c 45/00; C07d 5/22
U.S. Cl. 260—347.9                                6 Claims

ABSTRACT OF THE DISCLOSURE

Crystalline graphite, which has the normal X-ray diffraction pattern, and which has been intercalated with 55–65 percent by weight of chromic oxide based on the weight of the graphite, is a new reagent for the selective oxidation of primary alcohols to aldehydes. The method involves refluxing a mixture of the intercalated graphites, the primary alcohol and a solvent for the produced aldehyde and recovery of the aldehyde by filtration and evaporation of the solvent. The method is characterized by its specificity, high yields and simple procedure.

---

This invention relates to the oxidation of primary alcohols to their corresponding aldehydes by the use of graphite which has been intercalated with 55–65 percent by weight of chromic oxide based on the weight of the graphite.

It is well known that $CrO_3$ is a powerful oxidizing agent for organic materials. Oxidization may occur violently with the oxidation product being carbon dioxide, carbon monoxide, and water, etc. It was very surprising to find that when graphite is intercalated with 55–65 percent of $CrO_3$, the product is extremely stable. No attack of the graphite occurs at temperatures up to 400° C. in the absence of oxygen. Nor is the product shock sensitive. When ignited by an open flame the material burns quietly and without a "flash."

Chromic acid can be intercalated in graphite. Several methods have previously been described to achieve the insertion, calling for the use of acetic acid as solvent [N. Platzer and B. dela Martiniere, Bull. Soc. Chim., France, 177 (1961)], or the diffusion of the vapors of $CrO_3$ in the lattice of graphite at reduced pressure and high temperature [R. C. Croft, Australian J. Chem., 9, 201 (1956)].

I have found that by heating a mixture of chromic anhydride and graphite under reduced pressure, the intercalation was easy, the end product being of relatively constant composition and without any contaminant.

Crystalline graphite suitable for this invention may be either the naturally occurring material or synthetically produced material. It is necessary that it give the normal X-ray diffraction pattern for crystalline graphite where the distance between graphite planes is about 3.35 A. The so-called amorphous graphites which do not give such an X-ray diffraction pattern are not suitable for use in the practice of this invention. The insertion of 55 to 65 percent by weight of $CrO_3$ based upon the weight of the graphite by this method was verified by X-ray diffraction and the concentration of $CrO_3$ in the lattice determined by titration by the method of A. I. Vogel [Quantitative Inorganic Analysis, 3rd E., Longmans, London, 1961, pp. 286, 308].

I have investigated the oxidizing capacity of this reagent toward various alcohols including primary, secondary and tertiary alcohols and have discovered that the greatly moderated oxidizing power of chromic anhydride when intercalated in graphite is specific to the oxidation of primary alcohols to aldehydes. Secondary and tertiary alcohols are not oxidized. The oxidation is very simple. After contacting the alcohol with the chromic anhydride-graphite in an inert solvent, the aldehyde is obtained by filtration and evaporation of the solvent used in the reaction. Inert solvents are normally hydrocarbons such as petroleum ether, hexane, heptane, benzene, toluene, xylene which are inert to oxidation by this mild oxidizing agent. There is no problem with chromium salts or solvents difficult to eliminate, such as pyridine. The results are shown in Table I.

TABLE I

Oxidation of alcohols with $CrO_3$-graphite

| Alcohol | Contact time (hr.) | Yield of aldehyde (percent) | Analysis |
|---|---|---|---|
| 1-hexadecanol | 24 | 95 | VPC, 2,4-d, titration.[1] |
| Benzyl alcohol | 24 | 98 | VPC, 2,4-d. |
| Cinnamyl alcohol | 96 | 100 | VPC, 2,4-d, titration. |
| Furfuryl alcohol | 48 | 72 | VPC, titration. |
| Citronellol [2] | 24 | 90 | Do. |
| 1,6-hexanediol [3] | 24 | 60 | VPC, 2,4-d, titration. |
| Phenylethanediol [4] | 24 | 80 | Do. |
| Cyclohexylmethanol | 48 | 52 | Do. |

[1] By Smith-Mitchell method.
[2] This yield of aldehyde was observed where a trace of pyridine was added to the system, in order to prevent cyclization.
[3] The reaction product was the monohydroxy aldehyde.
[4] The aldehyde observed was benzaldehyde.

In addition to those primary alcohols shown in Table I which are oxidized to aldehydes in good yield the following primary alcohols were found to be oxidized also to the corresponding aldehydes methanol, ethanol, n-propanol, n-butanol, 2-methyl propanol, the mixed primary amyl alcohols, mixed primary hexanols, n-octyl alcohol, n-decyl alcohol, lauryl alcohol, oleyl alcohol, cetyl alcohol, stearyl alcohol, linolenic alcohol, propargyl alcohol and phenyl ethyl alcohol.

From the results it can be noted that the graphite intercalated with chromic anhydride is a very specific oxidizing agent for the conversion of primary alcohols to the corresponding aldehydes. The yields of the reaction are always good, even with sensitive structures like terpenes or allylic systems. With 1,2-diols, there is a rupture of the carbon chain, giving the corresponding aldehydes. The following secondary and tretiary alcohols were not oxidized and demonstrate the unusual selectivity of this reagent: 4-t-butyl cyclohexanol, 2-methyl cyclohexanol, 2-octanol, isopropanol, secondary and tertiary butanol, the mixed secondary and tertiary amyl and hexyl alcohols, cholesterol, and isopulegol.

While I do not wish to be limited by any theory, I believe that the good selectivity of the reagent for primary alcohols and the high yields of aldehydes observed with fatty alcohols must be related to its particular structure, the access to $CrO_3$ being restricted by the planes of graphite or the structure of the graphite crystallite. After oxidation, the resulting aldehyde must be desorbed and be less prone to enter the crystal structure, thus explaining the high yield of aldehyde, without secondary product. The residual chromium salts remain in the lattice of graphite under the experimental conditions used in the absence of water, thus eliminating cumbersome purification steps and undesirable secondary reactions.

Consequently, chromic anhydride intercalated in graphite has proved to be a unique reagent for specific oxidation of primary alcohols to the corresponding aldehydes. The yields are comparable to those observed with dipyridine-chromium (VI) complex by J. C. Collins, W. W. Hess and F. J. Frank, Tetrahedron Letters, 30, 3363 (1968). However, the dipyridine-chromium (VI) complex is not specific for the oxidation of primary alcohols but will also oxidize secondary and tertiary alcohols as well.

The following is a typical example of the preparation of graphite intercalated with $CrO_3$.

In a thick walled Pyrex tube 4 x 30 mm. a 20 gram portion of Acheson "Type 38" synthetic graphite was heated under reduced pressure at 200° C. for 24 hours in order to remove any adsorbed gas. After cooling, 40 grams of $CrO_3$ was added. The tube was then sealed under reduced pressure and heated at 200° C. for 48 hours. After cooling, the tube was opened (carefully) and the intercalated product washed with one liter of distilled water, 500 ml. of 10% hydrochloric acid and 500 ml. of distilled water. After a last washing with one liter of acetone, the product was dried at 100° C. to a constant weight. By analysis by the A. I. Vogel method previously referred to, the content of $CrO_3$ in the graphite was 55 percent in accordance with the value published by Croft previously referred to.

The following describes the oxidation of a typical primary alcohol.

In a 125 ml. flask were added 25 ml. of toluene, 10 grams of $CrO_3$-graphite prepared as described above, and 0.67 grams (0.005 mole) of cinnamyl alcohol. After a reflux of 24 hours, the cooled mixture was filtered on an asbestos pad. Evaporation of the solvent gave a quantitative yield of cinnamaldehyde. The molar ratio of $CrO_3$-alcohol was 10 to 1 in this run. Comparable yields were observed with a 4 to 1 ratio.

A similar technique was used with other alcohols and the determination of the yield was done by preparation of the corresponding 2,4-dinitrophenylhydrazone, by VPC analysis and titration according to the procedure of Smith-Mitchell [Anal. Chem., 22, 750 (1950)].

I claim:

1. In the method for converting to an aldehyde a primary alcohol selected from the group consisting of 1-hexadecanol, benzyl alcohol, cinnamyl alcohol, furfuryl alcohol, citronellol, 1,6 hexanediol, phenylethanediol, cyclohexylmethanol, methanol, ethanol, n-propanol, n-butanol, 2-methyl propanol, the mixed primary amyl alcohols, mixed primary hexanols, n-octyl alcohol, n-decyl alcohol, lauryl alcohol, oleyl alcohol, cetyl alcohol, stearyl alcohol, linolenic alcohol, propargyl alcohol and phenyl ethyl alcohol, the step which comprises refluxing a mixture of the primary alcohol, an inert solvent and graphite having chromic oxide intercalated therein until the oxidation of said alcohol to aldehyde has ceased, said graphite initially having the normal X-ray diffraction pattern of crystalline graphite.

2. The method as claimed by claim 1 wherein the reaction mixture is filtered to obtain a filtrate which is a solution of said aldehyde, and said filtrate is evaporated to remove said solvent to isolate said aldehyde.

3. The method as claimed by claim 1 wherein said alcohol is benzyl alcohol.

4. The method as claimed by claim 1 where the primary alcohol is 1-hexadecanol.

5. The method as claimed by claim 1 wherein the primary alcohol is furfuryl alcohol.

6. In the method for converting cinnamyl alcohol to cinnamyl aldehyde, the step which comprises refluxing a mixture of cinnamyl alcohol, an inert solvent and graphite having chromic oxide intercalated therein until the oxidation of said alcohol to aldehyde has ceased, said graphite initially having the normal X-ray diffraction pattern of crystalline graphite.

References Cited
UNITED STATES PATENTS

| | | |
|---|---|---|
| 1,755,692 | 4/1930 | Herrmann et al. _ 260—603 R X |
| 2,087,038 | 7/1937 | McMahon et al. _ 260—603 R X |

BERNARD HELFIN, Primary Examiner

U.S. Cl. X.R.

252—447; 260—598, 599, 603 R